(12) United States Patent
Bachmann et al.

(10) Patent No.: US 12,466,882 B2
(45) Date of Patent: Nov. 11, 2025

(54) PHARMACEUTICAL FORMULATIONS FOR ADALIMUMAB

(71) Applicant: ALVOTECH HF, Reykjavik (IS)

(72) Inventors: Gudrun Bachmann, Reykjavik (IS); Elin Edwald, Reykjavik (IS)

(73) Assignee: ALVOTECH HF, Reykjavik (IS)

( * ) Notice: Subject to any disclaimer, the term of this patent is extended or adjusted under 35 U.S.C. 154(b) by 500 days.

(21) Appl. No.: 17/673,149

(22) Filed: Feb. 16, 2022

(65) Prior Publication Data

US 2022/0169716 A1 Jun. 2, 2022

Related U.S. Application Data

(63) Continuation of application No. 16/646,864, filed as application No. PCT/EP2018/074912 on Sep. 14, 2018, now abandoned.

(60) Provisional application No. 62/560,889, filed on Sep. 20, 2017.

(51) Int. Cl.
| | |
|---|---|
| *A61K 39/395* | (2006.01) |
| *A61K 47/02* | (2006.01) |
| *A61K 47/10* | (2017.01) |
| *A61K 47/26* | (2006.01) |
| *C07K 16/24* | (2006.01) |

(52) U.S. Cl.
CPC ............ *C07K 16/241* (2013.01); *A61K 47/02* (2013.01); *A61K 47/10* (2013.01); *A61K 47/26* (2013.01)

(58) Field of Classification Search
None
See application file for complete search history.

(56) References Cited

U.S. PATENT DOCUMENTS

| | | | |
|---|---|---|---|
| 6,090,382 | A | 7/2000 | Salfeld et al. |
| 8,216,583 | B2 | 7/2012 | Kruase et al. |
| 8,420,081 | B2 | 4/2013 | Fraunhofer et al. |
| 8,821,865 | B2 | 9/2014 | Neu et al. |
| 9,085,619 | B2 | 7/2015 | Fraunhofer et al. |
| 9,346,880 | B2 | 5/2016 | Manning et al. |
| 2004/0038878 | A1 | 2/2004 | Tanikawa et al. |
| 2004/0170623 | A1 | 9/2004 | Arvinte et al. |
| 2006/0153846 | A1 | 7/2006 | Krause et al. |
| 2010/0278822 | A1 | 11/2010 | Fraunhofer et al. |
| 2016/0304599 | A1 | 10/2016 | Manning |
| 2016/0319011 | A1 | 11/2016 | Gokarn et al. |

FOREIGN PATENT DOCUMENTS

| | | | |
|---|---|---|---|
| WO | WO-200067789 | A1 | 11/2000 |
| WO | WO-2004016286 | A2 | 2/2004 |
| WO | WO-2006138181 | A2 | 12/2006 |
| WO | WO-2012065072 | A2 | 5/2012 |
| WO | WO-2014039903 | A2 | 3/2014 |

OTHER PUBLICATIONS

Abbvie Inc.: "Highlights of Prescribing Information (Humira Label)", Mar. 1, 2017, 94 pages.
International Search Report issued Dec. 11, 2018 in PCT/EP2018/074912, 4 pages.
Written Opinion issued Dec. 11, 2018 in PCT/EP2018/074912, 5 pages.
International Preliminary Report on Patentability and Written Opinion issued Mar. 24, 2020 in PCT/EP2018/074912, 6 pages.
U.S. Appl. No. 60/690,582, filed Jun. 14, 2005, Gokarn et al.
"2003 Xolair® Label", Genentech, Inc., 2003, 17 pages.
"Abbott Laboratories Amlounces Positive Results of Two Clinical Trials of Humira® (adalimumab) in, Crohn's Disease", Abbott Laboratories Press Release, May 18, 2004, 3 pages.
"Humira® Package Insert", Abbott Laboratories, Feb. 26, 2007, pp. 1-37.
"Humira® Package Insert", Center for Drug Evaluation and Research and Center for Biologics Evaluation and Research; 2002, 17 pages.
"Immune Globulin Intravenous (Human), 5%", Talecris Biotherapeutics; Inc, Oct. 2005, 13 pages.
"SYNAGIS® (PALIVLZUEVLLXB) Label", Medimmune, Inc., Jul. 2004, 7 pages.
Alan Kivitz et al., "Clinical Assessment of Pain, Tolerability, amd Preference of an Autoinjection Pen Versus Prefilled Syringe for Patient Self-Administration of the Fully Human, Monoclonal Antibody Adalimumab: The TOUCH Trial", 28(10) CLIN THER 2006 1619-29.
Gerald, M. Edelman et al., "The Covalent Structure of an Entire KG Immunoglobulin Molecule", Biochemisty, Proc Natl Acad Sci, vol. 63(1):1969, pp. 78-85.
Halvor N. Christensen, "Proteins as Buffers", Annals New York Academy of Sciences, 133(1), 1966, pp. 34-40.
Jan T. Jorgensen et al., "Paul Assessment of Subcutaneous Injections",The Annals of Pharmacotherapy, 30, 1996, pp. 729-732.
John B. Carpenter et al., "Rational Design of Stable Protein Formulations, Theory and Practice", Pharma. Biotechnol. vol. 13, Kluwer Academic/Plenum Publishers, New York 2002, 221 pages.
Joseph J. Valente et al., "Colloidal Behavior of Proteins: Effects of the Second Virial Coefficient on Solubility, Crystallization and Aggregation of Proteins in Aqueous Solutiott", 6(6) CIJRR. PHARM. BIOTECHNOL., 2005, 427-36.
Rex M.C. Dawson et al., "Data for Biochemical Research", 3rd Ed., Oxford University Press, 1986, 29 pages.
Santora et al., "Characterization of Recombinant Human Monoclonal Tissue Necrosis Factor-I Antibody Using Cation-Exchange HPLC and Capillary Isoelectric Focusing", Analytical Biochemistry, 275, 1999, pp. 98-108.
Sergio Schwartzman et al., "Does route of administration affect the outcome of TNF antagonist therapy?", Arthritis Research & Therapy, vol. 6(Suppl 2), 2004, pp. S19-S23.
Stephen B. Hanauer et al., "Human Anti-Tumor Necrosis Factor Monoclonal Antibody (Adalimumab) in Crohn's Disease: the Classic-I Trial", Gastroenterology, 2006, 130, pp. 323-333.

*Primary Examiner* — Yunsoo Kim
(74) *Attorney, Agent, or Firm* — Element IP, PLC

(57) ABSTRACT

A pharmaceutical composition comprises a buffer-less aqueous formulation of adalimumab, a salt, a polyol, and a polysorbate. The formulation is suitable for injection.

19 Claims, 1 Drawing Sheet

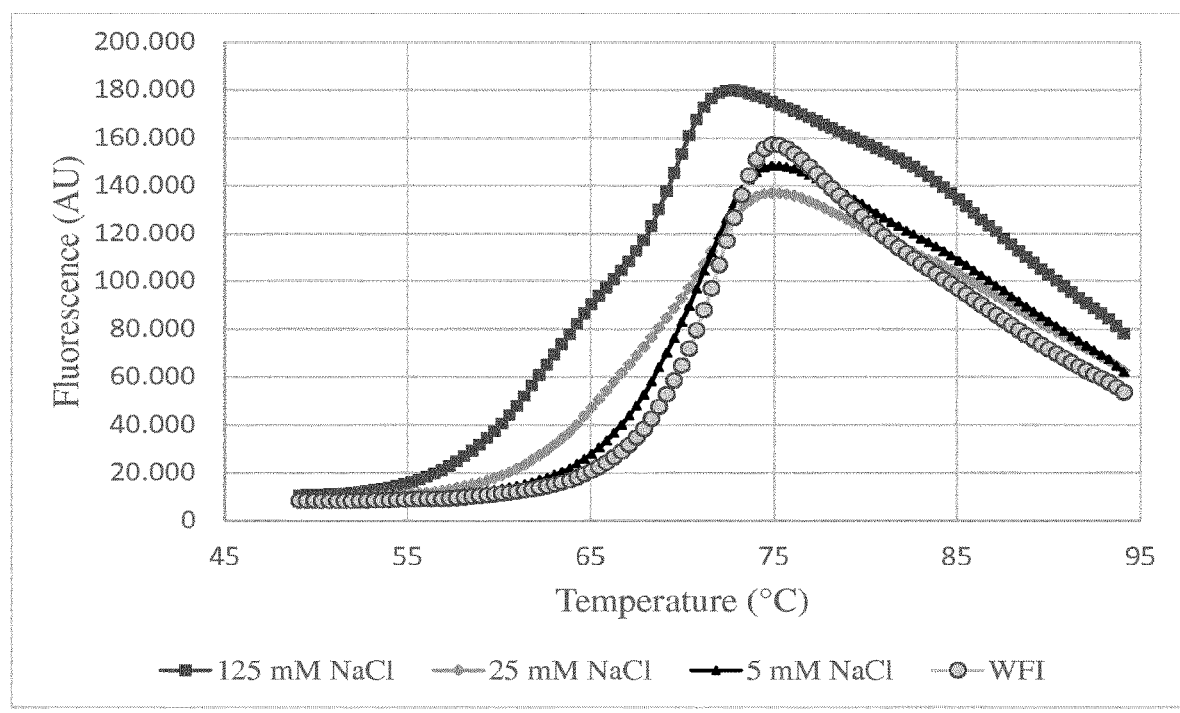

PHARMACEUTICAL FORMULATIONS FOR ADALIMUMAB

CROSS-REFERENCE TO RELATED APPLICATIONS

This application is a continuation of U.S. patent application Ser. No. 16/646,864, filed Mar. 12, 2020, which is a U.S. National Stage Entry of International Application No. PCT/EP2018/074912, filed Sep. 14, 2018, the disclosures of which are incorporated herein by reference in their entireties. This application claims priority to U.S. Provisional Application No. 62/560,889, filed Sep. 20, 2017, the disclosure of which is incorporated herein by reference in its entirety.

FIELD OF THE INVENTION

The present invention relates to pharmaceutical formulations for delivering the anti-TNFα antibody known as adalimumab.

BACKGROUND OF THE INVENTION

Adalimumab is an IgG antibody that binds TNF-α (Tumor Necrosis Factor alpha). It was disclosed in U.S. Pat. No. 6,090,382 under its code name of D2E7, which remained a popular identifier. The current commercial adalimumab product is sold under the brand name HUMIRA® (AbbVie) as a parenteral formulation that is typically administered by subcutaneous injection. The parenteral formulations are sold in two concentrations of adalimumab: the original 50 mg/ml and the more recent high concentration of 100 mg/ml.

The published patent application US 2006/0153846, which subsequently was granted as U.S. Pat. No. 8,216,583 to Abbott Biotechnology, Ltd (a predecessor to AbbVie), describes aqueous injectable formulations of adalimumab (D2E7). The formulations feature a buffer system comprising citrate and phosphate buffers. Typically the formulations further contain a surfactant and polyol. While adalimumab concentration is taught to range from 1 to 150 mg/ml, the preferred and exemplified concentration is 50 mg/ml. The buffered formulations, which have a pH of 4 to 8, are described as being stable and as having an extended shelf life of at least 18 months. This buffer system formulation strategy is believed to correspond to the commercial HUMIRA® formulation in the 50 mg/ml concentration, but not the 100 mg/ml concentration.

Other buffered formulations of adalimumab have also been disclosed. The U.S. Pat. No. 9,346,880, for example, describes many buffers as being suitable for adalimumab formulations, including citrate, phosphate, succinate, histidine, tartrate and maleate. Surprisingly, this patent asserts that the prior citrate/phosphate buffer system is "a rather poor buffer choice in comparison to others [ ]." One embodiment describes an adalimumab composition that has no buffer, i.e., substantially free of buffer. The formulations in the U.S. Pat. No. 9,346,880 generally include a "stabilizer" which can be a polyol and/or surfactant depending on the embodiment. Additional stabilizers can also be present and these include an amino acid, a salt, EDTA, and/or a metal ion. While a range of adalimumab concentrations are taught, the examples only use 50 mg/ml adalimumab. All of the exemplified formulations contain a buffer.

While the use of a buffer in aqueous formulations of proteins/antibodies is common, the omission of a buffer, as mentioned in the U.S. Pat. No. 9,346,880, is a sometimes tried variation. WO 2006/138181 describes "self-buffering" biopharmaceutical protein compositions as having several advantages. While buffers serve to maintain a desired pH of the formulation, finding the right buffer can be problematic according to this disclosure. The self-buffering formulations use the protein, such as an antibody, to provide buffer capacity to the formulation and do not add or contain a buffer additive. Sufficient buffer capacity is generally a function of, inter alia, the protein concentration. By removing the buffer, the formulation is simplified and the risks of deleteriously affecting stability, shelf-life, etc., are reduced. Adalimumab is mentioned as one of many possible proteins, but is not exemplified in a formulation.

U.S. Pat. No. 8,420,081 also teaches, inter alia, adalimumab formulations that do not contain a buffer. In general, the patent teaches that a protein can be formulated in water alone; e.g., without other excipients. Such simple formulations are described as having long term liquid storage stability. The patent also teaches that nonionic excipients can be added to the formulation. Adalimumab is a featured protein and is formulated in the examples as both a pure water formulation and as a formulation with nonionic excipients such as mannitol and polysorbate 80. The examples include various concentrations of adalimumab from 50 mg/ml to 200 mg/ml.

U.S. Pat. No. 8,821,865 describes high concentration adalimumab formulations that do not contain a buffer or a salt. The formulations may contain a polyol and/or a surfactant. Some embodiments are described as having less pain than a corresponding formulation that contains salt and buffer. Other embodiments are described as providing higher bioavailability. The formulations are described as being stable liquid formulations and several embodiments refer to low conductivity or low hydrodynamic diameter, which is achieved in general by excluding ionic excipients such as buffer and salt. One of the exemplified formulations consists of 100 mg/ml of adalimumab, 42 mg/ml of mannitol, and 1 mg/ml of polysorbate 80 in "water for injections." This formulation is believed to correspond to the commercial HUMIRA® formulation in the 100 mg/ml concentration.

Another disclosure of high concentration adalimumab formulations is found in US 2010/0278822. The liquid formulation excludes NaCl but contains more than 20 mg/ml of a polyol and 100 mg/ml (or more) of adalimumab. While the salt NaCl is excluded, buffers can be present in these high concentration formulations.

The above disclosures show that many proposals have been set forth for making a stable aqueous formulation of adalimumab. There is a need, however, for additional stable formulations of high concentration adalimumab.

SUMMARY OF THE INVENTION

The present invention relates to a pharmaceutical composition, comprising pharmaceutical-grade water having dissolved and/or suspended therein (a) 90-110 mg/ml of adalimumab; (b) 5 mM to 25 mM of a salt; (c) 180 mM to 300 mM of a polyol; and (d) 0.1% (w/v) of a polysorbate; and wherein the composition is buffer-less. The compositions are suitable for parenteral administration, especially for subcutaneous injection such as by a pre-filled single-use syringe or auto-injector. The salt is typically NaCl or another chloride salt, e.g. KCl, $MgCl_2$, $CaCl_2$, etc., and combinations thereof, but is not limited thereto. The polyol is typically mannitol, sucrose, or trehalose, but is not limited thereto. The polysorbate is normally polysorbate 80 or polysorbate 20. The compositions of the invention can exhibit good stability despite being buffer-less and yet containing salt.

BRIEF DESCRIPTION OF THE DRAWING

The FIGURE shows the results of Example 1 where the influence of NaCl concentration on adalimumab thermal stability is investigated.

DETAILED DESCRIPTION OF THE INVENTION

The compositions of the present invention provide aqueous, high concentration adalimumab formulations that are suitable for pharmaceutical administration by injection. The main component (or carrier) of the composition is water of pharmaceutical grade. "Pharmaceutical-grade water" refers to water meeting at least the purity and quality requirements suitable for making a parenteral pharmaceutical composition as set forth in the USP for "water for injection" (or "WFI"). As is understood by workers skilled in the art, WFI is characterized as the resultant of purifying drinking water by distillation or a purification process that is equivalent or superior to distillation in the removal of chemicals and microorganisms. WFI contains no added substances. The pharmaceutical-grade water can be sterilized prior to and/or after being combined with other components of the composition, but such is not required.

The pharmaceutical composition of the invention comprises several components that are dissolved and/or dispersed, but typically fully dissolved, in the pharmaceutical-grade water. These include: adalimumab, salt, polyol, and a polysorbate. Additionally, the composition is buffer-less. As used in the present invention, "buffer-less" means that no additional ingredient is present that has significant buffering capacity; i.e., the adalimumab is present in sufficient concentration so as to be self-buffering. As is well known in the art, a buffer provides resistance to change in a given pH or pH range, and buffering capacity refers to the degree or magnitude of that resistance. Hence, a buffering agent could be present in the formulation of the invention, provided it is in sufficiently low concentration so as to have insignificant buffering capacity or effect. This could occur where an excipient has multiple uses, such as citrate, but would be present in amounts (or form) insufficient to provide meaningful buffering effect. More preferably no buffering agents, such as phosphate, citrate, acetate, succinate, histidine, tartrate, and maleate buffers, are present in any amount.

The "adalimumab" used in the present invention refers to the well known human IgG anti-TNFα antibody having an INN name of adalimumab and whose sequence contains 1330 amino acids, including any accepted variations or biosimilars thereof. Because adalimumab is produced by a biological process, certain minor variations can occur from batch to batch, which variations are considered adalimumab and have no clinically meaningful effect. A biosimilar, as is understood by workers skilled in the art, refers to a biologic that is highly similar to the reference product (in this case to the adalimumab produced by AbbVie) and has no clinically meaningful differences therefrom in terms of efficacy and safety. The high degree of similarity between the biosimilar and reference product generally includes the physical, chemical, and biological properties and the minor differences permitted are not clinically meaningful. This understanding is used by the U.S. FDA and the European Medicines Agency (EMA) as well as by pharmaceutical companies seeking permission to market a biosimilar of a reference product. In the U.S., a biosimilar is generally denoted with an extension after the reference product name. For example, Amgen Inc. has an approved biosimilar of Humira® (adalimumab) that is called AMJEVITA (adalimumab-atto). To be free from doubt, all such extension names of adalimumab (e.g., adalimumab-atto) are within the scope of "adalimumab" as used in the present invention. The concentration of adalimumab in the composition of the invention ranges from 90 mg/ml to 110 mg/ml, often 95 mg/ml to 105 mg/ml, and typically is 100 mg/ml+/−2 mg/ml.

The salt is present in the composition of the invention in low amounts ranging from a concentration of 5 mM to 25 mM, more typically from 10-20 mM and often 10-15 mM. While salt is commonly used in parenteral formulations, typically as an osmolality adjusting agent, it can have an adverse effect on protein stability. The present invention is based in part on the discovery that small of amounts of the salt can increase osmolality without adversely affecting adalimumab stability and may provide other advantages as described below. Salts used in the present invention are pharmaceutically acceptable excipients; i.e., non-active agents suitable for being present in a parenteral formulation. Generally, the salts are inorganic salts formed from alkali metals or alkaline earth metals; e.g., sodium, potassium, magnesium, calcium, etc., with an appropriate counter-ion. Preferred salts include chloride salts of such metals; for example, magnesium chloride ($MgCl_2$), sodium chloride (NaCl), potassium chloride (KCl), calcium chloride ($CaCl_2$,) and combinations thereof. These salts generally show minimal thermal destabilization of adalimumab. In contrast, sodium metabisulfite ($Na_2S_2O_5$), which although it is a known antioxidant, is less preferred and in some embodiments is preferably excluded from the composition, because of thermal destabilization concerns. Typically, NaCl or KCl are used as the salt because, in thermal stability testing, these salts show minimal destabilization of adalimumab.

The polyol present in the composition of the invention can be one or more sugars or sugar alcohols and typically is selected from mannitol, sorbitol, trehalose, and sucrose, either individually or in combinations. The concentration of polyol in the composition ranges from 180 mM to 300 mM, more typically from 200 mM to 280 mM. Some embodiments use higher concentrations such as 230 to 280 mM while other embodiments use lower concentrations such as 190 to 240 mM. Selecting the concentration is often accomplished in light of the desired osmolality of the composition as the polyol species and the polyol concentration each have an effect on osmolality. For instance, in one embodiment the polyol is mannitol and the polyol concentration is typically between 220 mM and 240 mM, such as 230 mM. In another embodiment, the polyol is sucrose and the polyol concentration is typically between 240 mM and 270 mM, such as 255 mM.

The polysorbate is a well-known class of nonionic surfactants that are formed by esterifying ethoxylated sorbitan with a fatty acid. The polysorbate is typically one of the commercially available forms such as polysorbate 20, polysorbate 40, polysorbate 60, or polysorbate 80. Usually the polysorbate used in the invention is polysorbate 20 (polyoxyethylene sorbitan monolaurate) or polysorbate 80 (polyoxyethylene sorbitan monooleate); also known as TWEEN 20 and TWEEN 80, respectively. The nominal amount of polysorbate is 0.1% (w/v). For clarity, such a value includes greater and lesser values that would round to 0.1%, including 0.15% and 0.05%.

The pharmaceutical composition of the invention has an osmolality within a parenterally acceptable range, generally between 200 and 600 mOsm/kg. Typically the osmolality of the composition of the invention is within the range of between 240 and 420 mOsm/kg. In some embodiments, the composition has an osmolality within the range of 300 to 400 mOsm/kg, and typically between 330 and 380 mOsm/kg. In other embodiments, the osmolality is within the range of 270-325 mOsm/kg. Values within the above ranges can be attained by balancing the kind and amount of the polyol, the kind and amount of the salt, such as NaCl, and to a lesser extent, the kind and amount of polysorbate; given the amount of adalimumab in pharmaceutical-grade water.

The pharmaceutical composition of the invention typically has a pH in the range of 4.9 and 5.5. The pH can be adjusted, if necessary, by the addition of pH adjustment agents, e.g., an acid such as HCl, acetic acid, etc., or a base such as NaOH. Generally the pH of the composition is around 5.2

The pharmaceutical compositions of the present invention are typically consisting essentially of (a) 90-110 mg/ml of adalimumab; (b) 10 mM to 15 mM of a salt, especially NaCl; (c) 200 mM to 280 mM of a polyol; and (d) 0.1% of a polysorbate. The "consisting essentially of" phrase serves to exclude the addition of other buffers or salts, but would permit the addition of minor agents such as a pH adjusting agents, antioxidants, or preservatives. In a special embodiment of the invention, the pharmaceutical composition consists of (a) 90-110 mg/ml of adalimumab; (b) 10 mM to 15 mM of NaCl; (c) 200 mM to 280 mM of a polyol; (d) 0.1% of a polysorbate; and optionally a pH adjusting agent. in this context, the "consists of" language excludes all other pharmaceutical excipients and thus additional buffer or salt are excluded as well as antioxidants and preservatives. For clarity, impurities of sufficiently low level so as to be pharmaceutically acceptable are not excluded.

The pharmaceutical composition of the present invention is relatively stable. Typically the composition has satisfactory bulk stability for at least 6 months. In general such stability includes chemical and physical stability of the adalimumab such that only minor amounts of both fragmentation and aggregation of the protein are observed.

Beyond a lack of fragmentation/aggregation of the adalimumab, the present invention may also reduce the risk of compositional changes during storage and manufacturing by providing a small amount of salt in the formulation. The modern manufacture of biologic pharmaceuticals is trending toward the use of single-use containers and components at various points of the manufacturing train. These single-use components, i.e., disposable components, avoid the cleaning, sterilization, and inspection that are required when reusable components, such as a stainless steel vessel, are employed. The disposable materials are typically made of plastic or polymeric substances (e.g., silicone is used in tubing and filter membranes, etc.). These plastic or polymeric materials may have leachable residues and/or degradation products in various amounts depending on the material, its manufacturer, etc. Examples of such leachable residues include unreacted monomer, solvent, plastic additives, etc. These unwanted residues and degradation products can be leached or extracted from the plastic into the aqueous formulation owing to the direct surface contact. By providing a buffer-less formulation with salt, such as NaCl, the composition of the present invention may serve to lessen the solubilizing of non-polar compounds and provide less encouragement for such plastic-related materials to leach/extract into the composition. Likewise, by increasing the ionic strength of the composition, the gradient for ionic species to migrate into the composition may also be lessened. This insurance against small changes in the formulation is most appreciated in the context of bulk storage or single use syringe storage, where the contact may be prolonged. Surprisingly, however, this insurance against unwanted leaching/extracting comes without unacceptable increases in viscosity or physical/chemical instability of the formulation.

The pharmaceutical composition of the present invention can be made by combining adalimumab, salt, polyol, and polysorbate in a pharmaceutical-grade water to form a solution and/or suspension. The order of addition and method of combining is normally not of particular importance. For convenience and commercial practicality, the adalimumab is often formulated into the composition of the present invention using well known UF/DF (ultrafiltration/diafiltration) techniques. In general, the expressed adalimumab is captured and purified by various processes and then subjected to UF/DF for additional purification, concentration, and modification of the liquid media. The native adalimumab solution resulting from the previous purification process steps can be replaced using diafiltration, as is well known in the art. In making the composition of the present invention, the adalimumab can be diafiltered with a solution of salt, such as NaCl, and polyol in WFI. Typically in the prior art, such diafiltering media would also include a buffer, such as phosphate, but in the present invention no buffer is present as the composition is buffer-less. The polysorbate is typically added after the completion of the UF/DF process in order to avoid foaming. The polysorbate is often added to the adalimumab composition as a solution in WFI or in the diafiltering composition, e.g., the salt, polyol, and polysorbate in WFI. The adalimumab concentration is often set to greater than 100 mg/ml, such as 120 mg/ml, when UF/DF operations end so that the addition of the polysorbate solution and its diluting effect will result in the desired 90-110 mg/ml of adalimumab concentration. The pH can be adjusted, if needed, before, during, or after UF/DF operations such as by the introduction of HCl or other pH adjusting agent that is suitable for a parenteral formulation. The formation of the composition of the invention is not, however, limited to the use of UF/DF and any suitable process or means for combining the recited ingredients in the desired concentrations can be used to make the present invention.

The pharmaceutical composition of the present invention is useful for treating a variety of diseases and disorders that respond to anti-TNFα antibody treatment. These include autoimmune disorders such as rheumatoid arthritis, psoriatic arthritis, Crohn's disease, ulcerative colitis, and plaque psoriasis. The dosing amount and regimen are well known from the administration of HUMIRA®. Generally the pharmaceutical composition of the invention formulation is loaded into an auto-inject device or prefilled syringe to provide 0.8 ml, 0.4 ml, 0.2 ml, or 0.1 ml of the composition which corresponds to an adalimumab dose of 80 mg, 40 mg, 20 mg, or 10 mg, respectively.

The present invention will be further illustrated in the following non-limiting Examples.

Example 1

The effect of NaCl on the thermal stability of adalimumab was tested in a 7500 Real Time PCR thermocycler system from Applied Biosystems by a qPCR-based Thermofluor Assay using SYPRO Orange dye (Invitrogen, Cat. no.

S6651) to assess the apparent melting temperature (Tm) of adalimumab protein. The amount of fluorescence, which correlates with the degree of denaturation or melting of the protein, was determined as a function of temperature for several adalimumab samples having different concentrations of NaCl. The procedures are set forth below.

Adalimumab protein was supplied frozen in a matrix that contained phosphate buffer. The material was defrosted and then buffer-exchanged with water for injection (about 6 volumes) and concentrated to 108 mg/ml using UF/DF apparatus. Samples for testing were then prepared with a final concentration of 0.2 mg/ml adalimumab protein, 1:2000 dilution of the supplied SYPRO orange dye stock, and the indicated concentration of NaCl: 0, 5, 25 or 125 mM NaCl.

Fifty microliter samples were loaded into the wells of a 96-well plate and four melting curves were simultaneously measured for each condition. The melting temperature for each curve was determined by Protein Thermal Shift™ Software 1.3. from Applied Biosystems. Briefly, the differential of the melting curve is plotted and the maximum of the derivative indicates the estimated melting temperature. The resulting curves are shown in the FIGURE. The average melting temperature of each of the concentrations is shown in Table 1 with standard deviations as errors and the fluorescence values at certain temperatures are shown in Table 2.

TABLE 1

| Condition | Tm (° C.) |
| --- | --- |
| 0 mM NaCl | 72.3 ± 0.1 |
| 5 mM NaCl | 71.4 ± 0.2 |
| 25 mM NaCl | 71.6 ± 0.1 |
| 125 mM NaCl Tm1 | 69.5 ± 0.6 |
| 125 mM NaCl Tm2 | 63.4 ± 1.3 |

TABLE 2

| Temperature | Average Fluorescence (AU) | | | |
| --- | --- | --- | --- | --- |
| (° C.) | 0 mM NaCl | 5 mM NaCl | 25 mM NaCl | 125 mM NaCl |
| 49.1 | 8401.7 | 9143.8 | 9465.7 | 10574.9 |
| 59.3 | 10682.5 | 12463.7 | 16822.9 | 34372.7 |
| 69.1 | 52818.5 | 70137.0 | 84605.0 | 137593.1 |
| 79.4 | 130005.2 | 134274.8 | 124350.9 | 159664.3 |
| 89.2 | 75321.0 | 87229.3 | 84210.7 | 107407.8 |
| 94.1 | 53624.8 | 62160.1 | 62591.1 | 77932.0 |

The above-data shows that the presence of NaCl reduced the melting temperature of adalimumab protein compared to that of the sample without NaCl. However, at low concentrations of 5 mM and 25 mM, the reduction in thermal stability was modest and the melting curves of 0, 5, and 25 mM NaCl were close to overlapping. The 125 mM of NaCl condition, in contrast, showed a substantial decrease in melting temperature, or 2.8° C. lower than the 0 mM NaCl condition. Additionally, a second population appears in the 125 mM NaCl sample as seen by two melting temperatures (note the two entries in Table 2 for 125 mM NaCl); i.e., another melting temperature 8.9 degrees lower than the 0 mM NaCl melting temperature, further suggesting destabilization at this higher salt concentration. Accordingly, up to 25 mM NaCl has insubstantial effects on the thermal stability of adalimumab protein in WFI.

Example 2

The effect of other salts on the thermal stability of adalimumab was tested in accordance with the procedures described in Example 1. The melting point as determined according to the above procedure are reported below in Table 3 for the salts $MgCl_2$, KCl, and $CaCl_2$, each at three different concentrations.

TABLE 3

| Condition | Tm low (° C.) | Tm high (° C.) |
| --- | --- | --- |
| No salt (WFI) | N/A | 72.3 ± 0.1 |
| 5 mM $MgCl_2$ | N/A | 71.1 ± 0.0 |
| 25 mM $MgCl_2$ | N/A | 71.8 ± 0.1 |
| 125 mM $MgCl_2$ | 61.7 ± 0.2 | 69.9 ± 0.2 |
| 5 mM KCl | N/A | 71.6 ± 0.1 |
| 25 mM KCl | N/A | 71.9 ± 0.1 |
| 125 mM KCl | 64.4 ± 0.2 | 70.1 ± 0.2 |
| 5 mM $CaCl_2$ | N/A | 70.5 ± 1.1 |
| 25 mM $CaCl_2$ | 66.9 ± 0.8 | 72.7 ± 0.8 |
| 125 mM $CaCl_2$ | 61.4 ± 0.1 | 70.8 ± 0.2 |

All three salts developed a second, lower melting point at a concentration of 125 mM. Thus, at such concentrations, the thermal stability of adalimumab becomes a concern. The salt $CaCl_2$ developed a second melting point also in the 25 mM concentration, which renders it less preferred from a thermal stability perspective.

Example 3

The following formulations in Table 4 were made and placed on stability as described below. Two formulations correspond to the present invention (Samples 1 and 2) and a Control Sample corresponds to the formulation used in the approved 100 mg/ml HUMIRA® composition.

TABLE 4

| Ingredient | Sample 1 | Sample 2 | Control Sample |
| --- | --- | --- | --- |
| Adalimumab | 100 mg/ml | 100 mg/ml | 100 mg/ml |
| NaCl | 10 mM | 10 mM | — |
| Sucrose | 255 mM | — | — |
| Mannitol | — | 230 mM | 230 mM |
| Polysorbate 80 | 0.1% (w/v) | 0.1% (w/v) | 0.1% (w/v) |

The pH of each Sample (1, 2, and Control Samples) was 5.2±0.2.

The Samples were prepared as follows. Frozen adalimumab material was defrosted, concentrated, and buffer-exchanged with water for injection in like manner as described in Example 1 to obtain adalimumab in WFI in a concentration of 108 mg/ml. The adalimumab protein in water was then dialyzed against a 230 mM solution of Mannitol for Sample 2 and the Control sample and against 255 mM sucrose for Sample 1. Stock solutions of NaCl (4 M), and Polysorbate 80 (20% w/v) were added as required to reach the desired concentrations, and the pH was adjusted with Acetic Acid to pH 5.2±0.2.

Samples 1 and 2 and the Control Sample were placed in 1 ml long glass syringes, stoppered with 1 ml long bromobutyl plunger stoppers and put on stability at 2-8° C. or 25° C.±2° C. (60±5% relative humidity). A single sample was then extracted at predefined time points and measured for adalimumab monomer content, adalimumab aggregation content, and adalimumab degradation content using a high pressure size exclusion chromatography (HP-SEC) technique. The results of select time points are summarized below.

TABLE 5

Relative Monomer Content

| Composition | Initial Monomer (%) | 6 months at 25° C. (%) | 6 months at 2-8° C. (%) |
|---|---|---|---|
| Sample 1 | 98.5 | 96.5 | 98.2 |
| Sample 2 | 98.5 | 96.2 | 98.2 |
| Comparison | 98.5 | 96.8 | 98.3 |

TABLE 6

Relative Aggregation Content

| Composition | Initial Aggregation (%) | 6 months at 25° C. (%) | 6 months at 2-8° C. (%) |
|---|---|---|---|
| Sample 1 | 1.5 | 2.0 | 1.6 |
| Sample 2 | 1.5 | 1.9 | 1.6 |
| Comparison | 1.5 | 1.8 | 1.6 |

TABLE 7

Relative Degradation Content

| Composition | Initial Degradation (%) | 6 months at 25° C. (%) | 6 months at 2-8° C. (%) |
|---|---|---|---|
| Sample 1 | 0.0 | 0.8 | 0.1 |
| Sample 2 | 0.0 | 0.7 | 0.1 |
| Comparison | 0.0 | 0.6 | 0.1 |

The results show that Samples 1 and 2 perform in a similar fashion as the Control Sample and have acceptable stability.

Each of the patents, patent applications, and journal articles mentioned above are incorporated herein by reference in their entirety. The invention having been described it will be obvious that the same may be varied in many ways and all such modifications are contemplated as being within the scope of the invention as defined by the following claims.

The invention claimed is:

1. A pharmaceutical composition, comprising:
pharmaceutical-grade water having dissolved and/or suspended therein:
    (a) 90-110 mg/ml of adalimumab;
    (b) 5 mM to 25 mM of a chloride salt;
    (c) 180 mM to 300 mM of a polyol; and
    (d) 0.1% (w/v) of a polysorbate;
wherein said composition is buffer-less.

2. The pharmaceutical composition according to claim 1, wherein said salt is NaCl.

3. The pharmaceutical composition according to claim 1, wherein said polyol is at least one selected from the group consisting of mannitol and sucrose.

4. The pharmaceutical composition according to claim 3, wherein said polyol is mannitol and said polyol concentration is between 220 mM and 240 mM.

5. The pharmaceutical composition according to claim 3, wherein said polyol is sucrose and said polyol concentration is between 240 mM and 270 mM.

6. The pharmaceutical composition according to claim 1, wherein said polysorbate is polysorbate 80 or polysorbate 20.

7. The pharmaceutical composition according to claim 1, wherein said salt concentration is from 10 mM to 20 mM.

8. The pharmaceutical composition according to claim 6, wherein said salt is NaCl, said salt concentration is 10 mM, said polyol is mannitol, and said polyol concentration is 230 mM.

9. The pharmaceutical composition according to claim 6, wherein said salt is NaCl, said salt concentration is 10 mM, said polyol is sucrose, and said polyol concentration is 255 mM.

10. The pharmaceutical composition according to claim 1, wherein said composition has an osmolality within the range of 300 to 400 mOsm/kg.

11. The pharmaceutical composition according to claim 1, wherein said composition has a pH between 4.9 and 5.5.

12. The pharmaceutical composition according to claim 1, wherein said salt is at least one selected from the group consisting of $MgCl_2$, KCl, NaCl, and $CaCl_2$.

13. The pharmaceutical composition according to claim 12, wherein said salt concentration is from 10 mM to 20 mM.

14. The pharmaceutical composition according to claim 13, wherein said salt is NaCl.

15. The pharmaceutical composition according to claim 10, wherein said composition has an osmolality within the range of 330 to 380 mOsm/kg.

16. The pharmaceutical composition according to claim 11, wherein said composition has a pH of 5.2±0.2.

17. The pharmaceutical composition according to claim 8, wherein said polysorbate is polysorbate 80.

18. The pharmaceutical composition according to claim 17, wherein said composition has a pH of 5.2±0.2.

19. The pharmaceutical composition according to claim 9, wherein said polysorbate is polysorbate 80.

* * * * *